United States Patent Office 3,151,119
Patented Sept. 29, 1964

3,151,119
METHOD FOR PREPARING SUBSTITUTED THIOLCARBAMATES
Daniel W. Grisley and John A. Stephens, Dayton, Ohio, assignors to Monsanto Company, a corporation of Delaware
No Drawing. Filed Dec. 31, 1959, Ser. No. 863,096
9 Claims. (Cl. 260—293.4)

This invention relates to substituted thiolcarbamates. More particularly, this invention relates to methods for producing substituted thiolcarbamates from a mono-secondary amine, carbon monoxide, and sulfur, followed by alkylation with an alkylating agent. This invention especially contemplates the preparation of the S-hydrocarbyl-N,N-dihydrocarbyl thiolcarbamates.

The thiolcarbamates are an important class of compounds, being useful as intermediates in the preparation of other valuable substances, as well as for themselves as biological toxicants, particularly as herbicides. Several methods for the preparation of the substituted thiolcarbamates are known; however, these methods normally require somewhat expensive reactants such as phosgene and carbonyl sulfide. It is desirable to prepare the substituted thiolcarbamates in a direct, simple manner from readily available reactants and, therefore, a more economic process.

An object of this invention is to prepare substituted thiolcarbamates in a direct manner from readily available and relatively cheap reactants.

Another object of this invention is to provide a novel method for the preparation of the substituted thiolcarbamates.

Another object of this invention is to prepare the substituted thiolcarbamates by the interaction of a secondary amine with carbon monoxide and sulfur, followed by alkylation with an alkylating agent.

Other aspects, objects and advantages of this invention are apparent from a consideration of the accompanying disclosure and the appended claims.

According to the present invention, mono-secondary amines are interacted with carbon monoxide and sulfur to form a substituted ammonium thiolcarbamate salt as illustrated by the following equation:

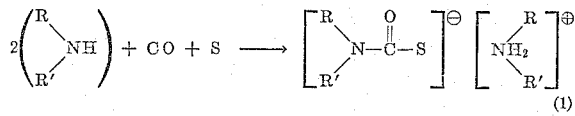

(1)

wherein R and R' are each the same or different hydrocarbyl radicals selected from the group consisting of alkyl, cycloalkyl, alkenyl, alkynyl, and aralkyl radicals, said R and said R' can together with the adjoining nitrogen atom be a heterocyclic group, i.e. R and R' together form a divalent polymethylene radical, for example the pentamethylene radical, wherein both free-valent bonds of said divalent polymethylene radical are joined to the nitrogen atom. The resulting substituted ammonium thiolcarbamate salt is then interacted with an alkylating agent to form the substituted thiolcarbamates as illustrated by the following equation:

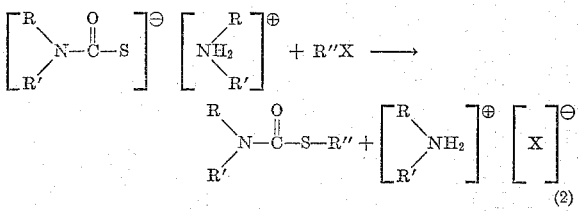

(2)

wherein R'' is selected from the group consisting of alkyl, cycloalkyl, alkenyl, alkynyl, and aralkyl radicals, said R, R' and R'' being the same or different, and X is an easily replaceable group.

In another embodiment of this invention, the substituted ammonium thiolcarbamate salt formed in reaction 1 is neutralized with an alkaline reagent at a temperature below 10° C. to form an alkaline dihydrocarbyl thiolcarbamate salt as illustrated by the following equation:

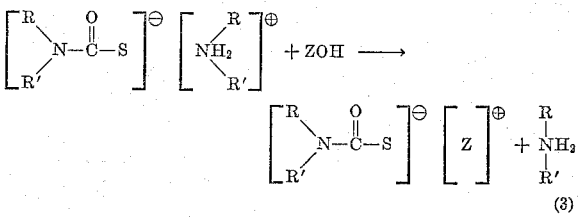

(3)

wherein Z is a cation selected from the group consisting of alkali metal, alkaline earth metal, and quaternary ammonium cations. The resulting alkaline dihydrocarbyl thiolcarbamate salt is then interacted with an alkylating agent to form the substituted thiolcarbamate as illustrated by the following equation:

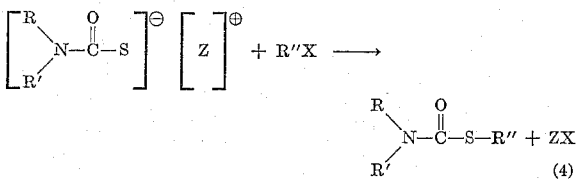

(4)

wherein R'' and X are as above defined.

The amine reactants employed in the process of this invention are the mono-secondary amines of the formula $$\begin{matrix} R \\ \phantom{R}\diagdown \\ \phantom{RRR}NH \\ \phantom{R}\diagup \\ R' \end{matrix}$$

wherein R and R' are each the same or different hydrocarbyl radicals selected from the group consisting of alkyl, cycloalkyl, alkenyl, alkynyl, and aralkyl radicals. In addition, the R and R' radicals together with the adjoining nitrogen atom can be joined together to form a heterocyclic radical; that is, a heterocyclic amine. Primary and tertiary amines cannot be used in the process of this invention to produce the thiolcarbamate. Furthermore, mixtures of primary amines with secondary amines are not desired because of unwanted side reactions. Therefore, if a primary amine is present in the reaction mixture, the product is a urea and not a thiolcarbamate.

Preferably, where R and R' are alkyl, alkenyl, or alkynyl radicals, each of these radicals has less than 8 carbon atoms per molecule. Also, the alkyl substituent of the aralkyl radical preferably contains less than 8 carbon atoms. Although each of these radicals preferably contains less than 8 carbon atoms, this invention is not limited to the use of amine reactants having less than 8 carbon atoms in the hydrocarbyl radicals and amines having less than 8 carbon atoms in the hydrocarbyl radicals and amines having more than 8 carbon atoms in each of the hydrocarbyl radicals can be used since the reactions involved in this process are dependent upon the functional groups present and not upon the length of the hydrocarbon chains. Examples of some suitable and preferred alkyl radicals include methyl, ethyl, propyl, isobutyl, tert-pentyl, sec-heptyl, 3-methyl-2-pentyl and octyl radicals. Examples of some suitable alkenyl radicals include vinyl, propenyl, butenyl, isobutenyl, pentenyl, 3,4-dimethyl-butenyl-2, and octenyl. Examples of some suitable alkynyl radicals include ethynyl, propynyl, butynyl, hexynyl, and octynyl radicals. Examples of some suitable and preferred aralkyl radicals include benzyl, methylbenzyl, phenylethyl, 3-phenylpropyl, 3-phenylbutyl, and 7-phenylheptyl. Examples of some suitable and preferred cycloalkyl radicals include cyclopentyl, cyclohexyl, and methylcyclohexyl. Each of these hydrocarbyl radicals can also be substituted with halogen or nitro groups if desired.

Illustrative examples of some suitable mono-secondary amines which can be used in the process of this invention include the following: N,N-dimethylamine, N-methyl-N-butylamine, N,N-di-n-butylamine, N,N-dioctylamine, N,N-diisopropylamine, N-ethyl-N-benzylamine, N,N-dibenzylamine, N-propynyl-N-phenylethylamine, N,N-dipropenylamine, N-methyl-N-isobutenylamine, N-propenyl-N-octenylamine, N,N-diethenylamine, N-propynyl-N-hexynylamine, N-butynyl-N-ocetenylamine, N-methyl-N-octynylamine, N,N-dicyclohexylamine, N-isobutyl-N-cyclohexylamine, and N,N-pentamethyleneamine (piperidine).

The alkylating agent, R″X, can be any alkylating agent having an easily replaceable group, represented by X, and a group represented by R″ which can be the same as R and R′ defined above. Thus, R″ is selected from the group consisting of alkyl, alkenyl, alkynyl, aralkyl, and cycloalkyl radicals and R″ can be the same as or different from either R or R′ or all of these hydrocarbyl radicals can be the same. Suitable replaceable groups include the halides, such as, chloride, bromide, and iodide; the sulfates; and the sulfonates. Examples of suitable alkylating agents include methyl iodide, propyl iodide, propyl chloride, hexyl bromide, methyl sulfate, nonyl sulfate, and the like.

The alkaline reagent, represented by ZOH, can be any alkali metal, alkaline earth metal, or quaternary ammonium compound which acts as an alkaline compound in water, and preferably is a hydroxide or a carbonate. Examples of useful alkaline reagents include sodium, potassium and lithium hydroxides and carbonates; magnesium, calcium, barium, and strontium hydroxides and carbonates; and tetramethyl ammonium and trimethyl benzyl ammonium hydroxides. Preferably, the alkaline reagent is an alkali metal hydroxide.

Although the reaction takes place by merely bubbling gaseous carbon monoxide into a solvent solution containing the amine reactant and sulfur, it is usually desirable to use elevated temperatures and pressures in the reaction step resulting in the formation of the substituted ammonium thiolcarbamate salt. In general, the temperature in the first reaction step is maintained within the range of from 60° C. to 130° C. in order to obtain suitable reaction times and higher yields. The reaction will take place slightly at room temperature with most of the amine reactants, and fairly rapidly with the heterocyclic amines, but preferably a reaction above 60° C. is used. The use of temperatures substantially above 130° C. is not desirable since the amine reactant and the sulfur will react at the more elevated temperature. The pressure is usually maintained above 50 p.s.i.g. in order to secure suitable reaction times; however, the reaction will take place to some extent over a long period of time at atmospheric pressure. Usually, the pressure is maintained at less than 500 p.s.i.g.; however, pressures as high as 1000 p.s.i.g. or higher could be used if desired.

The reaction of the amine, carbon monoxide and sulfur in the first reaction step is preferably carried out in the presence of an inert solvent, preferably one in which the amine reactant is soluble. Solvents which contain active hydrogen, such as the alcohols and the ketones, cannot be used in this reaction since these materials would be involved in the reaction and the substituted thiolcarbamates would not be formed. Examples of suitable inert solvents include: tetrahydrofuran, diethyl carbitol, dioxane, benzene, hexane, and the like. Tetrahydrofuran is a preferred solvent. Water is not a suitable solvent because under these reaction conditions the water would hydrolyze the thiolcarbamate salt. Thus, this first reaction step must be carried out under anhydrous conditions.

Although the amine, carbon monoxide, and sulfur can be reacted in stoichiometric proportions, it is preferred to use less than a stoichiometric amount of the amine reactant but an excess of the carbon monoxide reactant. Thus, as shown in reaction 1, 2 moles of the amine are required for reaction with 1 mole of the carbon monoxide and 1 mole of the sulfur if the reaction is to be carried out using the stoichiometric proportions. However, it is preferred to use less than 2 moles of the amine reactant per mole of the sulfur reactant, particularly in the preferred embodiment wherein the ammonium thiolcarbamate is neutralized with an alkaline reagent. Although it is preferred to use less than the stoichiometric amount of amine, an excess of this reactant, or any of the other reactants, can be used if it is so desired.

A catalyst is not required in conducting the reaction of the secondary amine with carbon monoxide and sulfur.

The reaction of the amine with the carbon monoxide and sulfur is primarily an addition type reaction resulting in the formation of a substituted ammonium thiolcarbamate salt as a single product. This salt is a solid at room temperature and is soluble in ethanol and tetrahydrofuran at elevated temperatures. At low temperatures, this salt is substantially insoluble in tetrahydrofuran. If desired, the substituted ammonium thiolcarbamate salt can be isolated and recovered merely by cooling the reaction mixture from the first reaction step and filtering-out the salt. However, in the usual method of operation, the salt is not separated from the reaction mixture since the alkylation step is preferably conducted in a solvent medium.

The alkylation step is advantageously carried out by merely introducing the alkylating agent into the reaction mixture obtained from the first reaction step at a temperature in the range of from −5° to +20° C. and preferably at atmospheric pressure. At temperatures much above 20° C., the yield of the desired substituted thiolcarbamate is lower because the ammonium thiolcarbamate salt is unstable at the more elevated temperatures and its decomposition products react with the alkylating agent. The use of temperatures substantially below about −5° C. is not desired since the ammonium thiolcarbamate salt is too insoluble in the solvent to effect rapid reaction with the alkylating agent. Although atmospheric pressures are preferred in conducting the alkylation step, superatmospheric pressures can be used and are desired at the more elevated temperatures, particularly at temperatures slightly above +20° C.

Preferably, the alkylation reaction is carried out using stoichiometric proportions of the alkylating agent and the ammonium thiolcarbamate salt; however, either reactant can be present if an excess is desired.

A catalyst is not required in conducting the alkylation step.

Advantageously, the alkylation step is carried out in the presence of a solvent, usually the solvent used in the first step involving the reaction of the amine with the carbon monoxide and sulfur. However, a different solvent can be used if desired.

The alkylation reaction results in the formation of the substituted thiolcarbamate and substituted ammonium salt product. Since the substituted ammonium salt product is substantially insoluble in the solvent medium, the desired thiolcarbamate product can be advantageously recovered by filtering the reaction mixture to separate out the ammonium salt product, stripping the filtrate to remove the solvent, and distilling the stripped material to recover the thiolcarbamate as a pure compound. Of course, other methods known to those skilled in the art can be used for separating and recovering the thiolcarbamate product from the reaction mixture.

In a preferred embodiment, the substituted ammonium thiolcarbamate salt formed from the reaction of the amine with carbon monoxide and sulfur is neutralized by admixture with an alkaline reagent before the alkylation step in order to improve the conversion of the substituted thiolcarbamate products. In neutralizing the ammonium thiolcarbamate salt, the substituted ammonium cation is replaced with an alkaline cation and the released amine is then free to react with any excess carbonyl sulfide present in the reaction mixture to form additional substituted ammonium thiolcarbamate salt. In this preferred embodiment, it is also preferred that less than a stoichiometric amount of the secondary amine be employed in the first reaction step with the carbon monoxide and sulfur so that there will be an excess of the other reactants available in the reaction system for reaction with the liberated free base. This neutralization step must be carried out at a temperature below $+10°$ C. because the use of temperatures substantially above this temperature results in hydrolysis of the substituted ammonium thiolcarbamate salt to an amine, carbon dioxide and hydrogen sulfide. Preferably, temperatures less than $-10°$ C. are not used because the substituted ammonium thiolcarbamate salt becomes too insoluble in the reaction mixture. Usually, the neutralization step is carried out at atmospheric pressure; however, subatmospheric or superatmospheric pressures could be used if desired. Also, it is not necessary to remove the solvent before neutralizing the substituted ammonium thiolcarbamate salt. Preferably, the alkaline reagent is used as an aqueous solution and it is not necessary to remove the water before conducting the alkylation step, which is conducted in the usual manner.

The substituted thiolcarbamate products prepared by the process of this invention are usually fairly low-boiling liquids which are generally insoluble in water but soluble in most organic solvents. Illustrative examples of some substituted thiolcarbamate products formed in the process of this invention include:

S-methyl-N,N-diisopropylthiolcarbamate
S-isobutyl-N-methyl-N-propenylthiolcarbamate
S-methyl-N,N-di-n-butylthiolcarbamate
S-butenyl-N,N-dicyclohexylthiolcarbamate
S-benzyl-N-butynyl-N-cyclopentylthiolcarbamate
S-methyl-N,N-dimethylthiolcarbamate
S-methyl-N-pentenyl-N-octynylthiolcarbamate
S-(2,3-dichloroallyl)-N,N-diisopropylthiolcarbamate
S-methyl-N,N-pentamethylenethiolcarbamate In general, these substituted thiolcarbamates are useful as biological toxicants, particularly as herbicides.

The advantages, the desirability and usefulness of the present invention are illustrated by the following examples:

Example 1

A mixture of 101 g. (1 mole) of diisopropylamine, 32 g. (1 mole) of sulfur, and 200 ml. of tetrahydrofuran was charged to a 1.4 liter, bottom-stirred autoclave. After sweeping the autoclave with nitrogen for five minutes, the autoclave was sealed and carbon monoxide was pressured therein to a pressure of 300 p.s.i.g. Upon heating the mixture to a temperature of 110° C. during a period of 35 minutes, the pressure in the autoclave rose to 375 p.s.i.g. After 5 minutes at this temperature, the pressure in the autoclave dropped to 325 p.s.i.g. and additional carbon monoxide was injected in order to raise the pressure to 400 p.s.i.g. The reaction mixture was then heated for a period of 1 hour while maintaining the temperature at 120° C. At the end of this time, the autoclave was allowed to cool overnight to room temperature. The gases were then vented from the autoclave and the reaction mixture was transferred to a 1-liter, 3-neck flask and cooled to 0°. The alkylation step was conducted by the dropwise addition of 142 g. (1 mole) of methyl iodide to the stirred reaction mixture while maintaining the temperature at 0–10° C. Upon completion of the addition of the methyl iodide, the reaction mixture was stirred at room temperature for a period of 3 hours. The insoluble product in the reaction mixture was removed by filtration and washed with diethyl ether. The filtrate was then heated at a temperature of 40° C. and a pressure of 20 mm. to remove the solvent and other volatile materials and leave a yellowish oil. Upon distillation of the oil, there was obtained 53 g. of S-methyl-N,N-diisopropylthiolcarbamate boiling at 92–96.5° C./14 mm. The product, which was obtained in 60% yield at a conversion of 30%, had a refractive index $n_D^{25}$ 1.4831 and was slightly yellow in color. The analysis of this product was 54.81 wt. percent carbon, 9.78 wt. percent hydrogen, 7.99 wt. percent nitrogen, and 18.22 wt. percent sulfur as compared with calculated values of 54.99 wt. percent carbon, 9.42 wt. percent hydrogen, 7.92 wt. percent nitrogen, and 18.57 wt. percent sulfur.

Example 2

In this example, the diisopropyl ammonium diisopropyl thiolcarbamate salt was prepared as in Example 1 and then neutralized with sodium hydroxide prior to the alkylation step. After conducting the reaction of the diisopropyl amine, carbon monoxide and sulfur, the reaction mixture formed was removed from the autoclave by means of a dip-tube at a temperature of 37° C. and a pressure of 150 p.s.i.g. and directed into a 2.1 molar sodium hydroxide solution which was cooled in an ice bath. During the venting of the autoclave, the temperature of the sodium hydroxide solution was maintained at 0° C. to $+3°$ C. The sodium diisopropyl thiolcarbamate was then alkylated in the neutralization medium with methyl iodide using the reaction conditions of Example 1 to obtain the S-methyl-N,N-diisopropyl thiolcarbamate at a conversion of 44%.

Example 3

In this example, the diisopropyl ammonium diisopropyl thiolcarbamate was isolated from the reaction mixture and then alkylated with the methyl iodide. The reaction of the diisopropyl amine, carbon monoxide and sulfur was carried out as in Example 1. The reaction mixture obtained was removed from the autoclave using 100 ml. of tetrahydrofuran and cooled to a temperature of $-10°$ C. with the formation of a white solid precipitate. The precipitate was separated by filtration and washed with 200 ml. of diethyl ether to obtain 54.8 g. of the diisoproyl-ammonium-N,N-diisopropyl thiolcarbamate. The infrared spectrum of this compound was found to be identical with that of a known sample of diisopropylammonium-N,N-diisopropyl thiolcarbamate.

The diisopropylammonium-N,N-diisopropyl thiolcarbamate was suspended in 150 ml. of tetrahydrofuran and alkylated with 72 g. (0.5 mole) of methyl iodide in the same manner as in Example 1. The solid present in the alkylation reaction mixture was removed by filtration and washed with 500 ml. of diethyl ether. Upon standing for 4 days, additional material precipitated in the filtrate and was removed by filtration. The filtrate was then evaporated to remove the solvent and leave an oil which was distilled to obtain 38 g. of S-methyl-N,N-diisopropyl thiolcarbamate at a conversion of 44% and a yield of 51%. This product had a boiling point of 102–104° C. at 21 mm.

Example 4

In this example, S-methyl-N,N-di-n-butylthiolcarbamate was prepared from di-n-butyl amine, sulfur, carbon monoxide, and methyl iodide. A mixture of 120 g. (1 mole) of the di-n-butyl amine, 32 g. (1 mole) of sulfur, and 200 ml. of tetrahydrofuran was charged to the autoclave used in Example 1. After sweeping the autoclave with nitrogen for a period of 5 minutes, carbon monoxide was pressured into the autoclave to obtain a pressure of 200 p.s.i.g. Upon heating the reaction mixture to a temperature of 90° C. during a period of 30 minutes, the pressure in the autoclave dropped to 87 p.s.i.g. Additional carbon monoxide was introduced into the autoclave during a period of 10 minutes to obtain a pressure of 200 p.s.i.g. while maintaining the temperature at 90–94° C. Thereafter, the autoclave was cooled to room temperature and the dark brown liquid reaction mixture transferred to a 1-liter, 3-neck flask. The volatile materials were removed from the reaction mixture by stripping at a temperature of 20° C. and a pressure of 20 mm. to obtain a dark brown oil which was then mixed with 300 ml. of dry diethyl ether and cooled to 0° C. While maintaining the temperature of the ether mixture at 0–10° C., 142 g. (1 mole) of methyl iodide was added to the stirred mixture. Thereafter, the reaction mixture was stirred for 1 hour at room temperature. At the end of this time, the reaction mixture was filtered to remove the insoluble salt. The filtrate was then stripped under vacuum to obtain a dark oil which was then distilled to obtain 62.5 g. of the S-methyl-N,N-di-n-butylthiolcarbamate boiling at 79–80° C.%/0.2 mm. This product was obtained in 62% yield and had an infrared spectrum which was identical with that of an authentic compound. The analysis of this product was found to be 59.07 wt. percent carbon, 10.41 wt. percent hydrogen, 6.89 wt. percent nitrogen, and 15.77 wt. percent sulfur as compared with calculated values of 59.05 wt. percent carbon, 10.57 wt. percent hydrogen, 6.71 wt. percent nitrogen, and 15.77 wt. percent sulfur.

*Example 5*

In this example, S-methyl-N,N-pentamethylenethiolcarbamate was prepared from piperidine, sulfur, carbon monoxide, and methyl iodide. A mixture of 85 g. of piperidine (1 mole), 32 g. (1 mole) of sulfur, and 200 ml. of tetrahydrofuran was charged to an autoclave. The autoclave was then swept with nitrogen for a period of 5 minutes and pressurized with carbon monoxide to a pressure of 300 p.s.i.g. The reaction mixture was heated, with stirring, to a temperature of 65° C. during a period of 10 minutes whereupon the pressure dropped to 150 p.s.i.g. The pressure in the autoclave was again increased to 300 p.s.i.g. by the injection of additional carbon monoxide. Upon heating the reaction mixture to 78° C. the pressure fell to 175 p.s.i.g. The reaction mixture was then heated to a temperature of 90° C. to obtain an autogenous pressure of 200 p.s.i.g. The total time involved in these heating steps was 25 minutes. At the end of this time, the autoclave was allowed to cool to room temperature overnight. After venting the gases from the autoclave, the reaction mixture, which was a yellow solution containing yellow crystals, was transferred to a 1-liter, 3-neck flask. The reaction mixture was cooled to 0° C. and 142 g. (1 mole) of methyl iodide added dropwise while maintaining the temperature at 0° C to +10° C. After allowing the mixture to stand at room temperature for a period of 2 days, the solid present in the reaction mixture was removed by filtration and washed with 1 liter of diethyl ether. Additional solid material which formed in the filtrate upon standing was also removed by filtration. The clear filtrate was then evaporated at 20 mm. pressure to obtain an orange oil which was distilled to obtain 63.2 g. of S-methyl-N,N-pentamethylenethiolcarbamate boiling at 121–123° C./14 mm. The product was obtained in 78% yield and had an analysis of 52.81 wt. percent carbon, 8.23 wt. percent hydrogen, 20.14 wt. percent sulfur, as compared with calculated values of 52.29 wt. percent carbon, 8.16 wt. percent hydrogen, and 20.57 wt. percent sulfur.

Reasonable variation and modification of the invention as described are possible, the essence of which is that there have been provided methods for preparing the substituted thiolcarbamates in an improved manner by interacting a mono-secondary amine with carbon monoxide and sulfur, and either alkylating the resulting product or neutralizing the resulting product with an alkaline reagent and then alkylating the neutralized product.

We claim:

1. The method which comprises reacting under substantially anhydrous conditions a mono-secondary amine, wherein the two substituent groups joined to the nitrogen atom are hydrocarbon radicals free from a benzenoid ring directly attached to said nitrogen atom, and the non-benzenoid portion of said hydrocarbon radicals contain up to 8 carbon atoms, with carbon monoxide and sulfur, wherein the carbon monoxide and sulfur are employed in substantially equivalent amounts on a mole basis, in an inert solvent medium free from active hydrogen atoms at a temperature of from about room temperature up to about 130° C. and superatmospheric pressure to obtain a substituted ammonium thiolcarbamate salt, alkylating said substituted ammonium thiolcarbamate salt in an inert solvent medium at a temperature in the range of −5° C. to +20° C. and atmospheric pressure with an alkylating agent to obtain a substituted thiolcarbamate, and recovering said substituted thiolcarbamate as product, wherein the said hydrocarbon radicals of the amine are the substituent radicals.

2. The method of claim 1 wherein said substituted ammonium thiolcarbamate salt is neutralized with an aqueous alkaline reagent selected from the group consisting of alkali metal, alkaline earth metal, and quaternary ammonium reagents at a temperature in the range of −10° C. to +10° C. and the resulting neutralized substituted thiolcarbamate salt alkylated with said alkylating agent.

3. The method which comprises reacting under substantially anhydrous conditions a mono-secondary amine of the formula

wherein R and R′ are selected from the group consisting of alkyl, cycloalkyl, alkenyl, alkynyl, and aralkyl radicals, and said R and said R′ radicals together can be a divalent polymethylene radical, and the non-benzenoid portion of the aforesaid radicals each contain up to 8 carbon atoms, with carbon monoxide and sulfur, wherein the carbon monoxide and sulfur are employed in substantially equivalent amounts on a mole basis, in an inert solvent medium free from active hydrogen atoms at an elevated temperature of from about 60° C. to about 130° C. and superatmospheric pressure up to about 1000 p.s.i.g., alkylating the resulting reaction mixture in an inert solvent medium at a temperature in the range of −5° C. to +20° C. and atmospheric pressure with an alkylating agent of the formula R″X wherein R″ is selected from the group consisting of alkyl, cycloalkyl, alkenyl, alkynyl and aralkyl radicals wherein each said radical contains up to 8 carbon atoms, and X is a readily replaceable group selected from the group consisting of halide, sulfate, and sulfonate groups and recovering from the last resulting mixture a thiolcarbamate of the formula

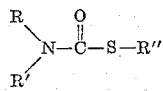

wherein R, R′ and R″ are as above defined.

4. The method of claim 3 wherein prior to alkylation the reaction mixture is neutralized with an alkaline reagent selected from the group consisting of alkali metal, alkaline earth metal and quaternary ammonium reagents at a temperature in the range of −10° C. to +10° C. and atmospheric pressure before said alkylation step.

5. The method which comprises reacting under substantially anhydrous conditions diisopropyl amine with carbon monoxide and sulfur in a tetrahydrofuran medium at a temperature in the range of 60–130° C. and a pressure in the range of 50–500 p.s.i.g., alkylating the resulting reaction mixture with methyl iodide at a temperature in the range of −5° C. to +20° C. and atmospheric pressure to form S-methyl-N,N-diisopropylthiolcarbamate, and recovering said S-methyl-N,N-diisopropylthiolcarbamate as product.

6. The method which comprises reacting under substantially anhydrous conditions di-n-butylamine with carbon monoxide and sulfur in a tetrahydrofuran medium at a temperature in the range of from 60–130° C. and a pressure in the range of 50–500 p.s.i.g., alkylating the resulting reaction mixture with methyl iodide at a temperature in the range of −5° C. to +20° C. and atmospheric pressure to form S-methyl-N,N-di-n-butylthiolcarbamate, and recovering said S-methyl-N,N-di-n-butylthiolcarbamate as product.

7. The method which comprises reacting under substantially anhydrous conditions piperidine with carbon monoxide and sulfur in a tetrahydrofuran medium at a temperature in the range of 60–130° C. at a pressure in the range of 50–500 p.s.i.g., alkylating the resulting reaction mixture with methyl iodide at a temperature in the range of −5° C. to +20° C. and atmospheric pressure to form S-methyl-N,N-pentamethylenethiolcarbamate, and recovering said S-methyl-N,N-pentamethylenethiolcarbamate as product.

8. The method which comprises reacting under substantially anhydrous conditions diisopropyl amine with carbon monoxide and sulfur in a tetrahydrofuran solvent medium at a temperature in the range of 60–130° C. and a pressure in the range of 50–500 p.s.i.g., neutralizing the resulting reaction mixture with aqueous sodium hydroxide at a temperature in the range of −10° C. to +10° C. and atmospheric pressure, alkylating the resulting neutralized reaction mixture with methyl iodide at a temperature in the range of −5° C. to +20° C. and atmospheric pressure to form S-methyl-N,N-diisopropylthiolcarbamate, and recovering said S-methyl-N,N-diisopropylthiolcarbamate as product.

9. The method which comprises reacting under substantially anhydrous conditions diisopropyl amine with carbon monoxide and sulfur in a tetrahydrofuran medium at a temperature in the range of 60–130° C. and a pressure in the range of 50–500 p.s.i.g. to form diisopropylammonium diisopropylthiolcarbamate salt, alkylating said diisopropylammonium diisopropylthiolcarbamate salt with methyl iodide at a temperature in the range of −5° C. to +20° C. and atmospheric pressure to form S-methyl-N,N-diisopropylthiolcarbamate, and recovering said S-methyl-N,N-diisopropylthiolcarbamate as product.

References Cited in the file of this patent

UNITED STATES PATENTS 2,396,879    Porter et al. _____ Mar. 19, 1946

OTHER REFERENCES

Bergmann: The Chemistry of Acetylene and Related Compounds, 1948, page 80, Interscience Publisher (N.Y.).

Parrod, C.A.: vol. 47 (1953), page 1606.

Rodd: "Chemistry of Carbon Compounds," 1952, vol. 1, part B; page 894.

Tilles: J.A.C.S., vol. 81 (February 1959), pp. 714–727.